United States Patent

[11] 3,631,230

[72] Inventor Tien Chi Chen
San Jose, Calif.

[21] Appl. No. 75,053
[22] Filed Sept. 24, 1970
[45] Patented Dec. 28, 1971
[73] Assignee International Business Machines Corporation
Armonk, N.Y.

[54] BINARY ARITHMETIC UNIT IMPLEMENTING A MULTIPLICATIVE STERATION FOR THE EXPONENTIAL, LOGARITHM, QUOTIENT AND SQUARE ROOT FUNCTIONS
7 Claims, 7 Drawing Figs.

[52] U.S. Cl. .......... 235/164, 235/158
[51] Int. Cl. .......... G06f 7/48, G06f 7/52
[50] Field of Search .......... 235/164, 158, 156

[56] References Cited

UNITED STATES PATENTS

| | | | |
|---|---|---|---|
| 3,234,369 | 2/1966 | Roth et al. .......... | 235/164 |
| 3,508,038 | 4/1970 | Goldschmidt et al. .......... | 235/164 |

OTHER REFERENCES

M. Lehman, " Serial Arithmetic Techniques," 1965 Fall Joint Computer Conf. NFIPS Proc. Vol. 27, 1965, pp. 715–725

E. V. Krishnamurthy, " On Optimal Iterative Schemes For High-Speed Division," IEEE Trans. on Computers, Vol. C–19, No. 3, Mar. 1970, pp. 227–231

M. J. Flynn, " On Division by Functional Iteration," IEEE Trans. on Computers, Vol. C–19, No. 8, Aug. 1970, pp. 702–706

J. C. Chen, " Efficient Arithmetic Apparatus and Method," IBM Tech. Disclosure Bulletin, Vol. 14, No. 1, June 1971, pp. 328–330

*Primary Examiner*—Eugene G. Botz
*Assistant Examiner*—David H. Malzahn
*Attorneys*—Hanifin and Jancin and Peter R. Leal

ABSTRACT: Apparatus and a method is described for efficiently achieving arithmetic evaluations for functions such as exponential, logarithm, quotient, and square root with a minimum use of multiplications or divisions. Basically, use is made of the fact that $x(1\pm 2^{-m})$ can be evaluated by a shift followed by an add. A pair of numbers $(x_k, y_k)$ can represent a function $x: f(x)=g(x_k, y_k)$, such that $g(l, y_n)=y_n$ for logarithm, quotient and square root. Then, multiplication by shifting is applied to $x_k$ with suitable adjustments on $y_k$, until $x_k$ is close to unity, at which time $y_k$ represents the desired answer. The exponential is computed by essentially reversing the logarithm procedure. A termination algorithm further improves accuracy. The apparatus involves two registers for $x_k$ and $y_k$, a local memory, an adder and a shift register.

INVENTOR
TIEN CHI CHEN

BY Peter R. Leal
ATTORNEY

BINARY ARITHMETIC UNIT IMPLEMENTING A MULTIPLICATIVE STERATION FOR THE EXPONENTIAL, LOGARITHM, QUOTIENT AND SQUARE ROOT FUNCTIONS

FIELD OF THE INVENTION

This invention relates to apparatus and a method for efficient binary arithmetic.

DESCRIPTION OF THE PRIOR ART

The development of fast, electronic digital computers has signaled the need for fast arithmetic circuitry and methods for performing the computations required in the computer. In the past, certain functions such as exponential, logarithm, division and square root in the binary number system have been achieved only with a considerable amount of expensive hardware and a premium in time of execution. One of the important reasons why this is so is because the above functions, prior to my invention, have required the use of excessive multiplications and/or divisions to achieve the desired answer.

Accordingly, it is a general object of this invention to provide apparatus and a method which allows improved binary computation of selected functions.

It is a more particular object of the present invention to effect apparatus and a method which allows the evaluation in binary format of the functions exponential, logarithm to the base $e$, division and square root to be achieved efficiently with minimum use of multiplications and/or divisions.

It is a still further object of this invention to provide apparatus and a method for computing in binary format the functions exponential, logarithm, division and square root, using a mechanism and technique involving mostly shifts and adds, which allow the computations to be performed by skipping over insignificant bits, such as zero bits, in the operands.

SUMMARY OF THE INVENTION

Basically, a pair of numbers $(x_k, y_k)$ can represent a function of $x: f(x)=g(x_k, y_k)$ such that $g(1,y_n)=y_n$. Multipliers with two significant bits are applied to $x_k$ with suitable adjustments on $y_k$, to bring $x_k$ close to unity, $y_k$ will approach the desired answer. This technique is applicable to division, square root and logarithms. The exponential function essentially reverses the logarithm procedure. In each case, looping stops after a predetermined number of passes through the loop and a termination algorithm can be applied.

BRIEF DESCRIPTION OF THE DRAWING

FIG. 2B shows the manner in which FIG. 2A is operated.

DESCRIPTION OF PREFERRED EMBODIMENT

Underlying Theory

Figure 1A:
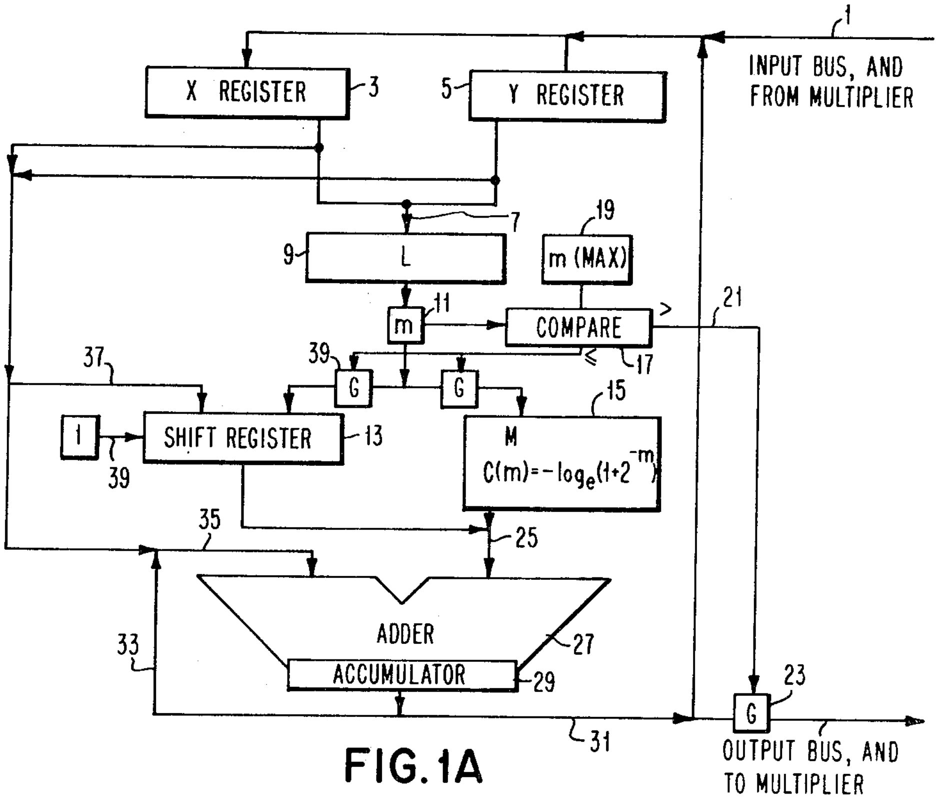
FIG. 1A shows the apparatus of my invention for performing the binary logarithm to the base $e$ and also the exponential function.

Before proceeding with an explanation of the structure of my invention, the mathematical theory underlying its operation will be discussed. This can best be done by discussing the theory on a case-by-case basis, as follows.

Logarithm and Exponential Functions

The invention will compute either $z=\log_e x$ or $w=\exp y$, using the same mechanism involving mostly adds, shifts and table look-up. For this embodiment, $0.5\leq x<1$, $0\leq y<1$. The two ranges are adequate for handling the fixed-point arithmetic portion of floating-point problems.

For the logarithm, if $y$ is initially set to 0, we have:

$$2=y+\log_e x=0+\log_e x=\log_e x \qquad (1)$$

A simple quantity $d$ is chosen such that $x'=x(1+d)$ is closer to unity than was $x$. If, correspondingly, we obtain $y'=y+T(d)$, where $T(d)$ is an entry in a prestored table, that is, $T(d)=-\log_e(A)D)$, then substituting $x', y'$ *for* $x, y$, we can write:

$$2=y+\log_e x=y'+\log_e x' \qquad (2)$$

$x'$ and $y'$ can be looked upon as a new value for $x$ and $y$. The process is repeated with a new selection of (possibly the same) $d$. As $x'$ is driven towards unity, $\log_e x$ approaches 0 and from (2) $y'$ converges towards $z$, the desired answer.

For the exponential, if $x$ is initially set to 1, we can write:

$$w=x(\exp y)=\exp y \qquad (3)$$

Again, $d$ is chosen, but with the purpose of making $y'=y+T(d)=y-\log_e(1+d)$ smaller than was $y$. If we correspondingly set $x'=x(1'+d)$, then by substituting $y', x'$ for $y, x$, we can write:

$$w=x'(\exp y') \qquad (4)$$

The same substitution is repeated with a new selection of $d$ each time. Then, as $y'$ is driven toward 0, $x'$ converges towards $w$, which is the desired answer.

The choice of $d$ profoundly effects efficiency, device simplicity and table size for $T(d)$. In the present scheme, $d$ is a positive fraction possessing exactly one significant bit, namely, $d=2^{-m}$, where $m$ is a positive integer. This permits the multiplication $x'=x(1+d)=x+xd$ to be replaced by a simple shift followed by an add. The simple choice for $m$ is $m=1+$(the number of leading zero bits in $y$) for the exponential algorithm, and for the logarithm computation $m=1+$(the number of leading zero bits in $(1-x)$ which is equal to $k=1+$(the number of leading one bits in $x$) except if $(1-x)=2^{-k}$, when $m=k-1$.

Convergence can be examined by writing $1-x=d+p$, for the logarithm case, and $y=d+p$ for the exponential case, where $p$ in both cases is equal to the remaining bit pattern after $d$. We then have, respectively, $1-x'=p+d(d+p)$ by substituting $x'$ for $x$, and $y'=d+p-\log_e(1+d)=p+d^2/2+0(d^3/3)$, by substituting $y'$ for $y$. It is to be noted that in both cases the effect of the most significant bit in the unprimed quantity has been removed, accompanied by a minor influence on the bit pattern. Further, we have $x<x'<1$ and $y>y'>0$. In other words, $x', y'$ lie in the same range as $x, y$ in the respective algorithms and are closer to the goal of 1 and 0 than $x, y$, respectively. The particular choice for $d$ means that only the leading significant bit leads to an iteration in a binary fraction. In a binary fraction half the bits are insignificant, on the average, and can be skipped over. Thus, a $2n$-bit fraction computation requires only about $n$ iterations for full-length accuracy. The following terminating algorithm further halves the number of iterations by taking advantage of $x, y$ near 1,0, respectively.

Terminating Algorithm for Logarithm and Exponential

When $x$ is sufficiently close to unity, its logarithm can be written as:

$$\log_e(1-g)=31\ g-g^2/2-\ldots\cong-g-e \qquad (5)$$

for the case $0<e<g^2/2(1-g)$

Thus, we have as a terminating algorithm:

$$2=y+\log_e(1-g)\cong y-g=y+x-1 \qquad (6)$$

Also, in the exponential case, if $y$ is close to 0, that is, $y=g<1$, $$\exp g=1+g+g^2/2+1+g+e' \qquad (7)$$

for the case $0\leq e'<g^2/2(1-g)$

Thus, for the exponential terminating algorithm, we have:

$$w=x(\exp g)\cong x+xg \qquad (8)$$

For $2n$-bit problems, after about $n/2$ iterations, one can expect $g$ to be less than $2^{-n}$, that is, $g\leq 2^{-n-1}(2-2^{-n})$. Then the error $e$ is less than half a unit in the last place.

Division Function

For generating the division function $z=y/x$ by means of a mechanism involving mostly shifts and adds, the number $x$ should lie in the range (0.5, 1.0) for rapid conversion and hardware simplicity. Again, as with the logarithm and exponential functions, this range is natural for doing the fixed-point arithmetic portion of floating-point problems if the radix is equal to 2 or some integral power thereof.

The principle of the invention is as follows. For the division function $z=y/x$, a simple quantity $d$ is chosen such that $x'=x(1+d)$ is closer to unity than was $x$. Then $y'=y(1+d)$ is computed. $x'$ and $y'$ can be viewed as a new value for $x$ and $y$, respectively. By substituting $x'$, $y'$ for $x,y$, we have $y/x=y'/x'$. The process can be repeated over and over again, each time with a new (usually different) $d$. Then, as $x'$ is driven closer to unity, $y'$ converges toward $z=y/x$, the desired answer.

Again, as with the logarithm and exponential function, $d$ is a positive fraction having exactly one significant bit, namely, $d=2^{-m}$, where $m$ is a positive integer. This constraint permits the replacement of multiplications by shifts, greatly improving the efficiency and device simplicity. Thus, in both $x'=x(1+d)=x+xd$ and $y'=y(1+d)\ y+yd$, multiplication by $d$ is replaced by shifting the multiplicand to the right $m$ positions.

A simple choice for $m$ is as follows:

$m=1+$(the number of leading zero bits in $(1-x)$). (9)

This is equivalent to $k=1+$(the number of leading one bits in $x$), except when $1-x=2^{-k}$, at which point $m=k-1$.

To determine the effect of one iteration of the above, we can write $x=1-d-p$, where $p$ represents the bit pattern beyond the significant bit $d$. Then, for the substitution number $x'$, it can be seen that $x'=1-p-d(d+p)$. Thus, the effect of the most significant fraction bit in $x$ is removed with only minor influence on the remaining bit pattern if $d$ is already quite small. Further, if $x$ is less than 1, so is $x'$ and subtraction is never needed. Each iteration of the above-described loop therefore tends to remove leading significant bits from $(x-1)$, while preserving roughly the remaining bit pattern. Since in a binary fraction an average of half of the bits are insignificant, the number of iterations for a $2n$-bit computation is only about $n$.

Terminating Algorithm for Division Function

The following terminating algorithm further halves the number of iterations by using a short multiplication. When $x$ is sufficiently close to unity, its reciprocal can be written as $1/x=1/(1-e)=1+e+e^2/(1-e)=1+e$, approximately. Hence, $z=y/x$ is closely approximated by:

$$x=y(1+e)=y+ye \qquad (10)$$

with a precise relative error equaling $e^2/(-e^2)$, which is exactly 0 if $e$ is 0. When $e$ is nonzero, this error is positive and quite small. For a $2n$-bit fraction, if $e$ is less then $2^{-n}$ in magnitude, then the error is less than one unit in the last position.

Square Root Function

If two fixed-point binary numbers, $y$ and $x$, are manipulated such that $z=y/x^{1/2}$, then if $y$ is equal to $x$ the result is the square root of $x$.

The number $x$ should lie in the range (0.5, 2.0) for rapid convergence. Again, as in the above explanations, a simple quantity $d$ is chosen such that a new $x$, namely $x'=x(1+d)^2$ becomes closer to 1 than to $x$. Similarly, if a new $y$, namely $y'$, is chosen such that $y'=y(1+d)$, then if $x'$, $y'$ are substituted for $x,y$, the following equality can be written:

$$z=y/x^{1/2}=y'/x'^{1/2} \qquad (11)$$

As this process is repeated, each time with a new and usually different choice for $d$, $x$ gets increasingly close to unity. $x^{1/2}$ behaves similarly and therefore $y$ converges towards the desired answer $z$. Again, as in the above examples, d is a signed fraction, namely, $\pm 2^{-m}$ where $m$ is a positive integer. As above, this constraint permits the replacement of multiplications by shifts, greatly improving efficiency and device economy. Thus, $y'=y(1+d)=y+yd$, and $x'=x(1+d)^2=x''+x''d$, where $x''$is defined as $x+xd$. Thus, the multiplications by $d$ are replaced by shifting the multiplicand $n$ positions. A simple choice for $d$ is the following. The sign of $d$ is the sign of $(1-x)$, while $m=2+$ (the number of leading zero bits in the magnitude of the fraction $(x-1)$). For example, if $x=1.0001...$, then $m$ is equal to 5(2+3 leading zero bits) and $d$ is negative. If, however, $x=0.11101...$, then the magnitude of $(x-1)$ is 0.0001... . Hence, $m$ is equal to 5 also, but $d$ is positive in this case. To investigate convergence, the quantity $x=1-2d-p$, where $p$ presents the bit pattern beyond the significant bit ($2d$), should be examined. After the first iteration we have $x'=1-p+$ (terms to the order $d^2$). In other words, the effect of the most significant fraction bit in $x$ is removed with only minor influence on the remaining bit pattern if $d$ is already quite small. Each iteration of the loop, again, tends to remove the most significant bit from $(x-1)$, while preserving the remaining bit pattern. Thus, in the fraction representing the magnitude of $(x-1)$, half of the bits are zeros and are therefore skipped over, on the average. The average number of iterations for a $2n$-bit computation is only about $n$. The following terminating algorithm further halves the number of iterations by invoking a short multiplication.

Terminating Algorithm for Square Root

When $x$ is sufficiently close to unity, its inverse square root can be developed into a Taylor series:

$$1/(1+)^{1/2}=1-e/2+3e^2/8-... \qquad (12)$$

It can be shown that if the magnitude of $e$ is no greater than $2^{-n}$, then the first two terms of the series will approximate the series with relative error less than $2^{(-2n-1)}$. For the $2n$-bit problem, it takes only $n-2$ two iterations to bring $e$ into this desired range, and the terminating algorithm is:

$$y/(1+e)^{1/2}\cong y-ye/2 \qquad (13)$$

Structure

With reference to FIG. 1A there is seen the structure of one embodiment of our invention. In that figure, input bus 1 is connected to X register 3 and Y register 5. It may desirable to provide a few guard bits for registers 3 and 5, over and above the number of bits in the desired answer, the number of guard bits depending upon the desinger's choice. X and Y registers 3,5 are both connected via bus 7 to left-bit counter 9. Left-bit counter 9 is connected to storage register 11, the output of which is connected to shift register 13 and memory 15. Memory 15 has $n$ entries each being $-\log_e(1+d)$, where $zn$ is the fraction length. The output of register 11 is also connected to comparison circuitry 17 as one input thereto. The second input to comparison circuitry 17 is a register 19 containing a programmable preset $m$(max). For a $2n$-bit fraction, $m$(max) can be preset to $n$ bits for the terminating algorithm error to be less than one bit in the last position. A lesser number can be set if lesser precision is desired. The "greater than" output of compare circuitry 17 is connected via line 21 as an enabling input to gate 23. The output of gate 23 is the output bus and is also connected to the multiplication facilities of the computer. Memory 15 has output 25 connected to adder 27. Adder 27 is a conventional adder well known in the art, having accumulator 29. It will be recognized by those of skill in the art that the accumulator is described for ease of illustration, and that the X or Y register could equivilantly be used for its function. The output of accumulator 29 is connected via bus 31 to gate 23, via bus 33 as an input back into the adder, and via bus 1 back into the X and Y registers. Finally, both the X and Y registers 3 and 5, respectively, are connected to the input of the adder via bus 35 and to shift register 13 via bus 37. Gating suitable for allowing the various binary quantities to be connected from one part of the apparatus to another, well known to those of ordinary skill in the art, is herein assumed but is left out of the drawing, for the most part, to preserve the clarity thereof.

Figure 1B:
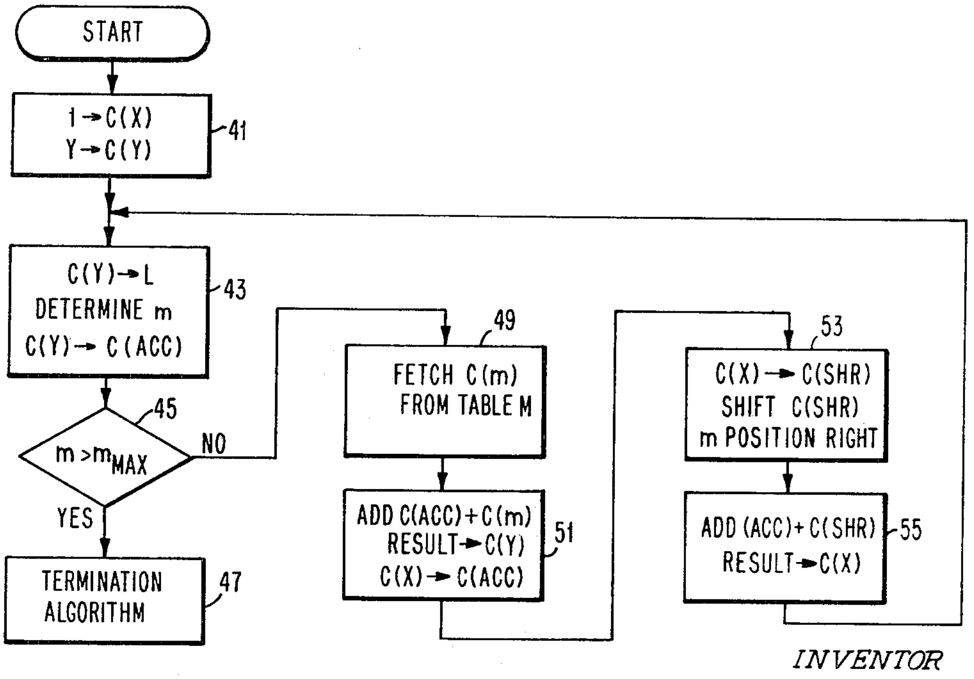
FIG. 1B shows the manner in which the apparatus of FIG. 1A is operated to obtain the exponential function.

With reference to FIG. 1B, there is seen the manner in which the circuitry of FIG. 1A is operatied in order to obtain the exponential function $w=\exp y$. Referring to block 41, it is seen that initially the quantity 1.000... in binary is sent over bus 1 to become the contents C(X) of the X register 3. Similarly, the binary fraction $y$ is set to become the contents of the Y register 5. At 43 of the same figure, it can be seen that the next step involves sending the contents of the Y register to the left-bit counter 9 via bus 7, and also concurrently to accumulator 29 via bus 35. A shift count $m$ is developed in left-bit counter 9, as explained above, by setting $m$ to 1 plus the number of leading zero bits in $y$. Thus, it can be seen that left-bit counter 9 of FIG. 1A is any suitable piece of hardware, well known in the art, having capability of counting leading zero bits or, in some cases one bit and adding 1 to the number of bits counted. This can be done by shifting until a bit value change is detected and then adding 1. Thus, 1 counter 9 and shift register 13 could be the same piece of hardware. At 45 a test is undertaken. That is, the value of $m$ is sent from storage 11 and the value of $m$(max) is sent from storage 19 to comparison circuitry 17 in FIG. 1A. Assuming that $m$ is not greater than $m$(max), the value of $m$ stored in register 11 is sent to memory 15 as an address from which to fetch the table entry $C(m)=<v-\log_e(1+d)$ which is $-\log_e(1+2^{-m})$, as seen in 49. At 51, the next step is to add the contents of the accumulator to the value $C(m)$ accessed from memory 15 over bus 25 in adder 27, and to send the result to the Y register 5 via buses 31 and 1. Thus, the new $y$, namely $y'=y+T(d)=y-\log_e(1+d)$, is obtained and stored in the Y register.

As seen at 51 and 53, the contents of the X register are then sent to the accumulator via bus 35 and to shift register 13 via bus 37, and the contents of the shift register are shifted $m$ positions to the right. The shift performs the multiplication $xd$ for $x'=x(1+d)$, explained previously. As seen at 55 in FIG. 1B, the contents of the accumulator and the contents of the shift register are sent to adder 27 via buses 35 and 25, respectively, and added together. The result, which is $x'=x(1+d)$, is sent back to become the new $x$ and resides as the contents of the $x$ register. The operation then loops back to box 43 and continues until such time as $m$ is greater than the above-defined preset $m$(max). When such occurs, the termination algorithm of equation (8) is performed by invoking the multiplier.

Figure 1C:
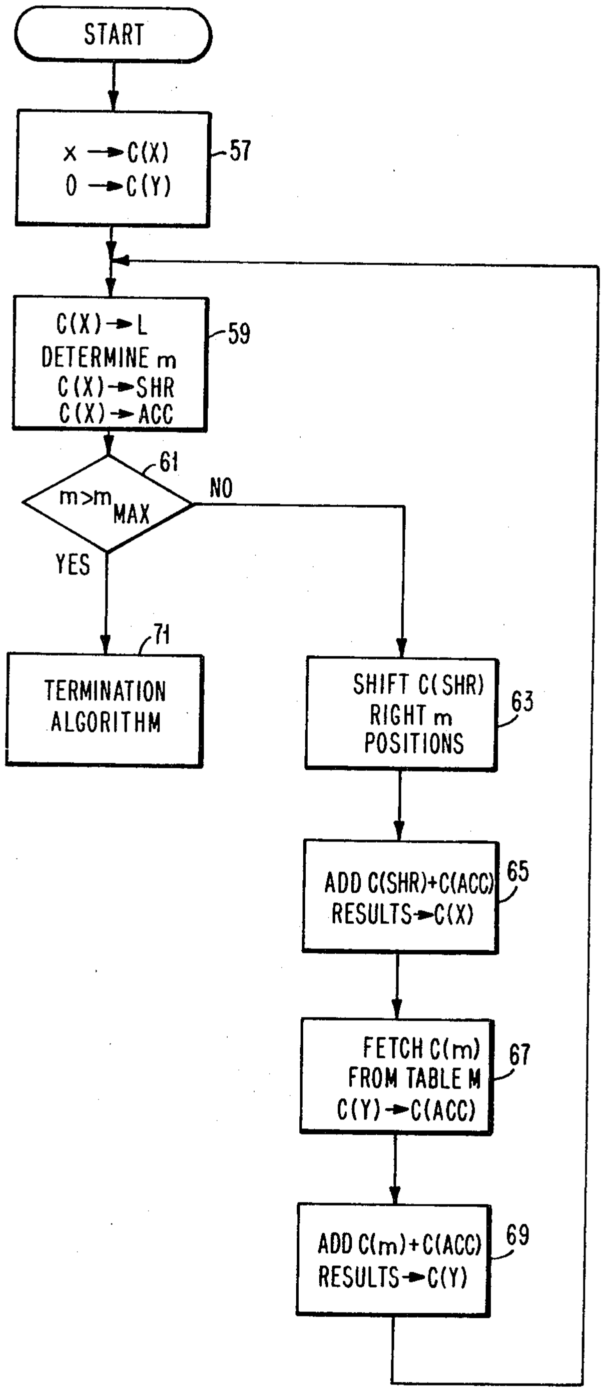
FIG. 1C shows the manner in which the apparatus of FIG. 1A is operated to obtain the logarithm function.

Referring now to FIG. 1C, there is seen the manner in which the apparatus of FIG. 1A is operated to obtain the logarithm function, $z=\log_e x$. Initially, as seen at 57, the binary fraction $x$ is sent to become the contents of the $x$ register 3 and zero is sent to become the contents of the Y register 5. The contents of the X register is sent to the left-bit counter where the shift count $m$ are developed, as explained previously in the theory for the logarithm, and, concurrently, the contents of the X register are sent to the shift register 13 via bus 37 and to the accumulator 29 via bus 35. A test is performed in comparison circuit 17. If $m$ is not greater than $m$(max), then, as seen in 63, the contents of shift register 13 are shifted right by $m$ positions, using the shift count stored in storage 11. This performs the calculation $xd=x2^{-m}$. As seen in 65, the shifted contents of the shift register are then added to the contents of the accumulator which are currently the value $x$. The result of this addition is sent to the X register 3 to become a new $x$. (The result being $x'=x(1+d)$ as explained previously. As seen at 67, the value $C(m)$ which is $-\log_e(1+2^{-m})$ is fetched from memory 15 and, concurrently, the value of the Y register is sent via bus 35 to become the contents of accumulator 29. At this point, as seen in 69, $C(m)$ is sent via bus 29 to the adder where it is added to the contents of the accumulator. The result is $y'=y+T(d)=y-\log_e(1+d)$ and is stored back into the Y register 5 to become the new $y$. The loop then continues until, as $x'$ approaches zero, the value in the Y register approaches the desired answer. When $m$ becomes greater than $m$(max), as seen at 71, the termination algorithm is employed. This is done by resetting the value of the shift register to 1 via bus 39. This value is then sent via bus 25 to the adder where it is subtracted from the contents of the accumulator and the results stored in the accumulator. The contents of the accumulator and the contents of the Y register are then added to yield the final result $z$ according to the terminating algorithm of equation (6), and the answer can be sent to the output bus directly.

Division Function

Figure 2A:
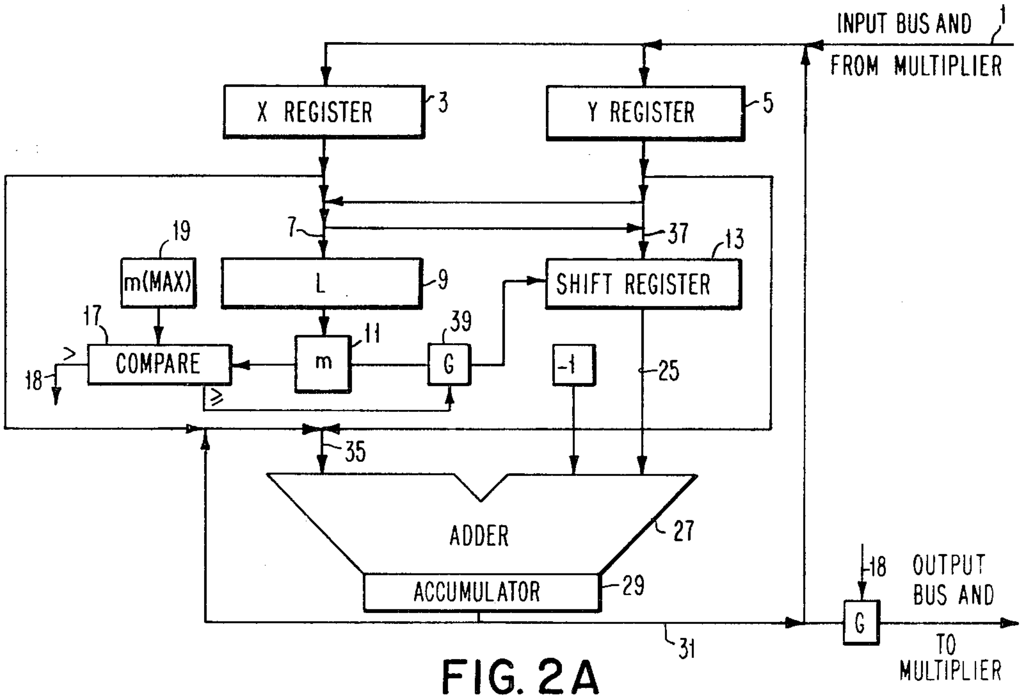
FIG. 2A shows apparatus for obtaining the division function.

Referring now to FIG. 2A, there is seen apparatus for performing division according to my invention. Input bus 1 is connected to X register 3 and Y register 5, which are the same registers as were seen in FIG. 1A and are therefore identified by the same numeral. The X register and the Y register are connected to the left-bit counter 9 via bus 7 and to shift register 13 via bus 37. Left bit counter 9 and shift register 13 are the same as seen in FIG. 1A. The L counter develops a shift count $m$ which is stored in storage 11. Storage 11 is connected to comparison circuitry 17, which has as its other input the value $m$(max) from register 19. As with other functions $m$(max) storage can be set to the value $n$, where the length of the fractions $x,y$ are $2n$-bits, for an error due to the termination algorithm of less than one bit in the last position. Storage 11 is also connected to be gated to provide an input shift count to shift register 13 via gate 39. Adder 27 is provided having accumulator 29. Shift register 13 is connected to one input of adder 17 via bus 25 and the X and Y registers 3 and 5 are, respectively, connected to another input of the adder via bus 35. The output 31 of the accumulator is connected to the output bus and also is effectively connected to transfer the contents of the accumulator back into either the X register 3 or the Y register 5. Further, the output of the accumulator is connected to transfer its contents back into the adder to be added with other quantities.

Figure 2B:
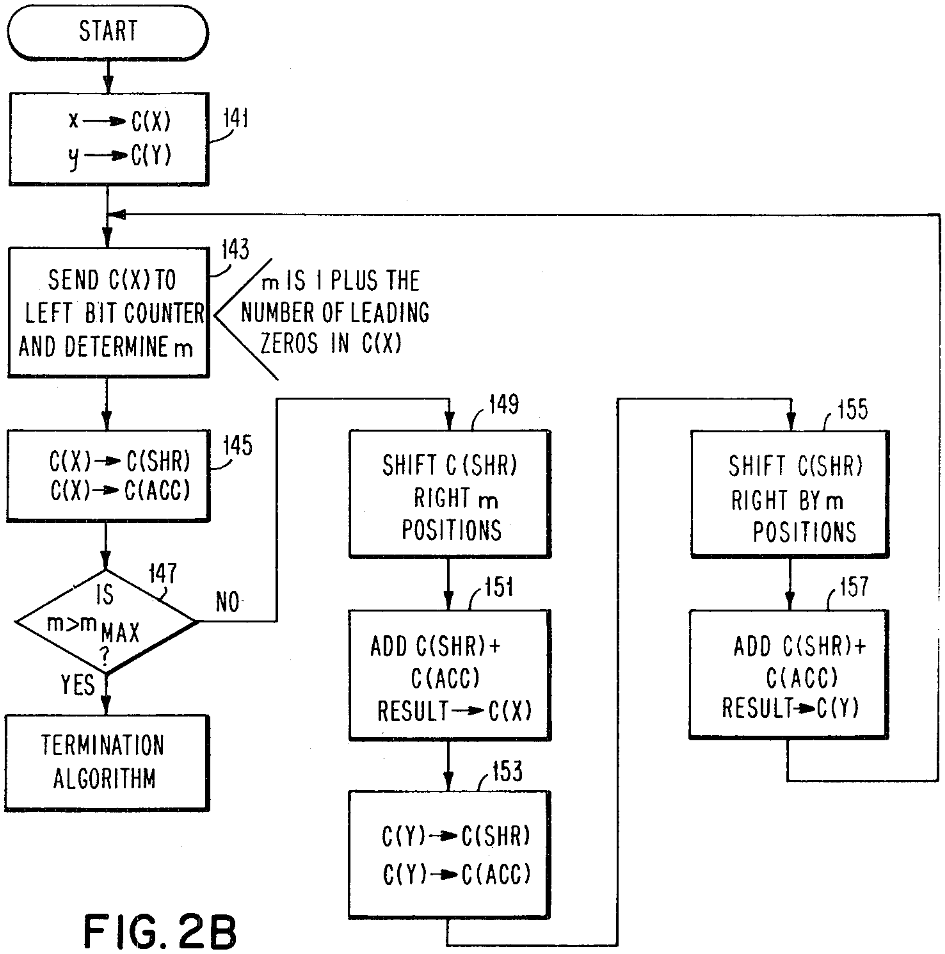

Referring to FIG. 2B, there is seen the manner of operation of the apparatus of FIG. 2A. As seen at 141, the binary fractions $x$ and $y$ are sent to become the contents of X register and the Y register 3 and 5 via input bus 1. In 143, it can be seen that the contents of the X register are sent to left-bit counter to determine the shift count $m$. For this function, $m$ is defined as 1 plus the number of leading zeros in the contents of the $x$ register. $m$ is stored in storage 11. As seen in 145, the contents of the X register are sent via bus 37 to the shift register and concurrently sent via bus 35 to accumulator 29. A test is performed at 147 to determine whether $m$ is greater than a preset $m$(max) as defined above. Since this is the first pass through the loop, $m$ will not be greater than $m$(max) and therefore the shift count $m$ is gated via gate 39 to shift register 13. As seen in 149, the contents of the shift register are shifted $m$ positions to the right. Since C(SHR) is now the original $x$, this step computes the quantity $xd$. The shifted contents of the shift register and the contents of the accumulator are then added together as seen in 151 and the result, which represents a new $x$, namely $'=x(1+d)=x+xd$, is sent back to become the contents of the X register 3. At this point, the contents of the Y register are sent via bus 37 to the shift register and are also concurrently sent to become the contents of the accumulator via bus 35. As seen in 155, the contents of the shift register are right shifted by $m$ positions. Since C(SHR) is now the original $y$, this step computes the quantity $yd$. In 157, the contents of the shift register and the contents of the accumulator are added together. This result, which represents the new $y$, namely $y'=y(1+d)=y+yd$, is sent to become the contents of the Y register 5. The loop repeats itself, with a new, and usually different, $m$ each time. As each new $x$ becomes increasingly close to unity, each new $y$ converges toward the desired quotient. When $m$ becomes greater than $m$(max), the termination algorithm $z=y+ye$ can be applied. $e$ is developed in the adder by subtracting $C(x)$ from the quantity 1 to form $(1-x)$, and is sent to the multiplier mechanism as a multiplier. C(Y) is sent via bus 35 to the accumulator and is also forwarded to the multiplier mechanism for use as the multiplicand. The product is returned to become the contents of the Y register. The Y register is then added to the contents of the accumulator, and the result is the desired quotient. If $e$ happens to be 0, the Y register already contained the correct result and no termination algorithm need be invoked.

Square Root Function

Figures 3A, 3B:
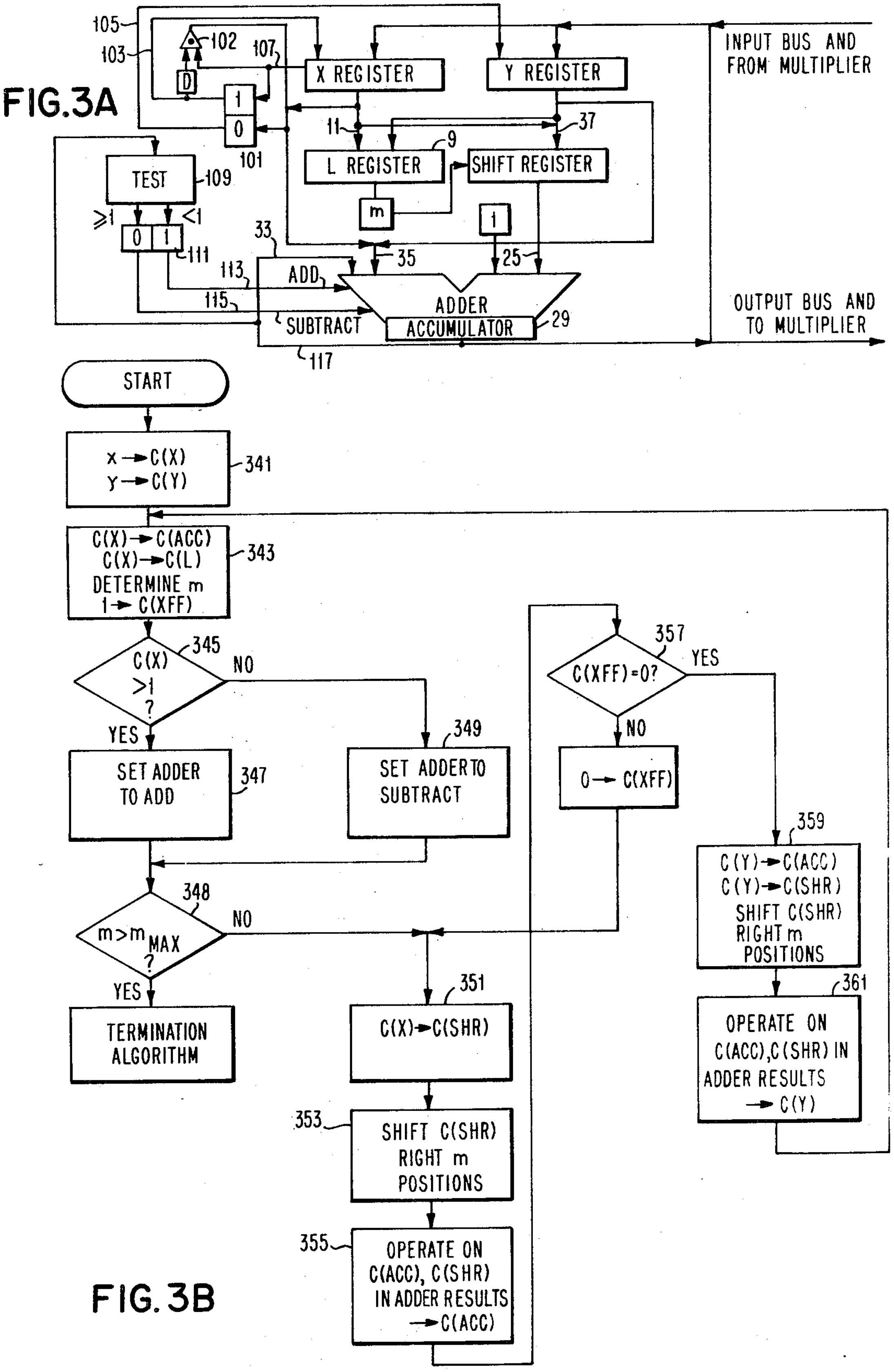
FIG. 3A shows apparatus for obtaining the square root function.
FIG. 3B shows the manner in which the apparatus of FIG. 3A is operated.

Referring to FIG. 3A, there is seen apparatus for performing the square root function of my invention. The apparatus of FIG. 3A is the same as that for FIG. 2A with certain modifications. For example, line 107 is a line from the gating circuitry of the X register, which indicates that the contents thereof have been gated out. Line 107 is connected to the one input of $x$ flip-flop 101, the output of which is connected to AND-gate 102 via a suitable delay. Line 107 is also connected as a second input to AND-gate 102. The output of AND-gate 102 is connected to set the zero side of $x$ flip-flop 101. The output from the one side of $x$ flip-flop 101 is also connected, via line 103, to provide a signal which can be used at the suitable time for gating out the contents of the X register. A similar function is provided by line 105 from the zero side of $x$ flip-flop 101.

Accumulator 29 is connected via line 117 to compare circuit 109. If the value of the accumulator is greater or equal to 1, then the compare circuit sets the one side of flip-flop 111. The one output of flip-flop 111 provides a signal over line 113 to specify that the add function of the adder is to be performed. Similarly, if the contents of the accumulator is less then 1, comparison circuit 109 sets the zero side of flip-flop 111, the output of which provides a signal over line 115 to specify that the subtract operation is to be provided by the adder.

With reference to FIG. 3B, there is seen the manner in which the apparatus of FIG. 3A is operated to obtain the square root function. It will be recalled from the discussion of the underlying theory of my invention that the function $z=y/x^{1/2}$ is to be evaluated by choosing a new $y$ and a new $x$ each iteration and keeping the ratio constant. That is, $y'/x'^{1/2}+y(1+d)/x^{1/2}(1+d)$ which is the same as $y(1+d)/(x(1+d)(1+d))^{1/2}=y(+d)/(x''(1+d))^{1/2}$ where $x''=x(1+d)=x+xd$. Thus, in the explanation of the operation to follow, there will be two cycles to the $x$ loop of the apparatus inasmuch as the first cycle will be needed to compute $x''$ and a second cycle will be need to compute $x''(1+d)$ for the new $x$, while only a single cycle is needed to compute $y(1+d)$ for the new $y$.

Referring to FIG. 3*d*, it can be seen from box 341 that initially the binary value $x$ and the binary value $y$ are loaded into the X and Y registers, respectively. As seen in 343, the contents of the X register are sent to left-bit counter 9 via bus 11 and to accumulator 29 via bus 35. At this point the contents of the accumulator are sent to test circuit 109 and if they are less than 1, a signal on line 113 specifies that an addition operation is to be taken in the adder as seen in box 347. Otherwise, a subtraction operation is indicated over line 115 as seen in box 349. The usual test on $m$ is made. Assuming that $m$ is not greater than $m$(max), the contents of the X register are sent to the shift register as seen at 351, and the shift register is shifted right $m$ positions. As seen at 355, the contents of the accumulator and the shift register are sent to the adder via buses 33 and 25, respectively; and the operation $C(ACC)\pm C(SHR)$ is performed, the sign depending upon the value of lines 113 and 115. As can be seen with reference to the $x$ flip-flop 101 in FIG. 3A, the first time a quantity is gated from the X register the flip-flop is set to its one position. A short delay thereafter, the output of the one side of the $x$ flip-flop enables AND-gate 102, the delay being sufficient to make certain that the signal from the one output of $x$ flip-flop 101 does not arrive at AND-gate 102 until the pulse from line 107 has dropped. On the second iteration for the X register, a second gating pulse will appear on 107 and will cause AND-gate 102 to be activated, thus setting the $x$ flip-flop to its zero position. Thus, the zero state of the $x$ flip-flop indicates that two passes have been made through the $x$ loop to calculate $x'$. *That is, as seen at 357 of FIG. 3B, a test can be performed on the contents of the* $x$ flip-flop. If the contents are not 0, they will be set to zero as explained next above and the X iteration will be performed again beginning at block 351. As the operation exits block 355, the value for $x'$, namely $x''(1+d)$ has been computed, the test will be taken at 357 and box 359 will be entered into inasmuch as the $x$ flip-flop will have already been set to zero. Box 359 is the beginning of the computation for the new $y$, namely $y'$. The contents of the Y register are sent to the accumulator via bus 35 and to the shift register via bus 37. The contents of the shift register are shifted right $m$ positions and in box 361 the contents of the accumulator and the contents of the shift register are operated upon according to the signal on line 113 or 115. The iteration is continued as many times as necessary until $n$ leading zeros appear in the operand in the X register, at which time the test at 348 is successful and the terminating algorithm is entered into; that is, the quantity $1-x=e$ is developed in the accumulator and sent to the multiplier. The contents of the Y register are sent to the accumulator and then to the multiplier as multiplicand. The product returns through the Y register into the shift register via bus 37 where a unit right-shift is made. The contents of the accumulator are than added to the contents of the shift register and the sum is the desired answer which could be routed to the output bus. If $e$ happens to be 0, the use of the multiplier can be omitted. The contents of the Y register is then the answer, which can be gated out directly.

While the invention has been particularly shown and described with reference to a preferred embodiment thereof, it will be understood by those skilled in the art that various changes in the form and details may be made therein without departing from the spirit and scope of the invention.

What is claimed is:

1. Apparatus for performing arithmetic operations on operands comprising, in combination:
   - first storage means for holding a first operand and a second operand;
   - means, coupled to said first storage means for determining an operation parameter from the contents of said first storage means;
   - shifting means, coupled to said first storage means and to said determining means, for shifting the contents of said first storage means according to said operation parameter;
   - memory means, coupled to said determining means, said memory means containing entries addressable by said operation parameter, said entries representing mathematical functions of said operation parameter; and
   - adder means coupled to said shifting means, said first storage means, and to said memory means, for performing addition operations to form new first and second operands such that as one of said first and second operands approaches a predetermined value, the other of said first and second operands approaches a desired answer.

2. The combination of claim 1 wherein
   - said first operand has the value 1.000...;
   - said second operand has any binary value;
   - said predetermined value is 0; and
   - said desired answer is the exponential function of said second operand.

3. The combination of claim 1 wherein
   - said first operand has any binary value;
   - said second operand has the value 0;
   - said predetermined value is 1.000...; and
   - said desired answer is the logarithm to the base $e$ of said first operand.

4. Apparatus for performing arithmetic operations on operands comprising, in combination;
   - first storage means for storing a first operand and a second operand;
   - means, coupled to said first storage means for determining an operation parameter from the contents of said first storage means;
   - shifting means, coupled to said first storage means and to said determining means, for shifting the contents of said first storage means according to said operation parameter;
   - adder means, coupled to said shifting means and to said first storage means, for performing addition operations to form new first and second operands such that as one of said new first and second operands approaches a predetermined value the other of said new first and second operands approaches a desired answer.

5. The combination of claim 4 wherein said first operand is a binary fraction;

said second operand is a binary fraction;

said predetermined value is 1.000...; and said desired answer is the quotient of said second operand divided by said first operand.

6. The combination of claim 4 wherein said first and second operands are equal binary fractions;

said predetermined value is 1.0000...; and said desired answer is the square root of said first operand.

7. The combination of claim 4 wherein said first operand is a binary fraction;

said second operand is the value 1.0000...;

said predetermined value is 1.0000...; and said desired value is the inverse square root of said first operand.

* * * * *